United States Patent
Zhang et al.

(10) Patent No.: US 11,854,717 B2
(45) Date of Patent: Dec. 26, 2023

(54) PREPARATION METHOD OF 3D PRINTING-BASED YBCO SUPERCONDUCTING TWISTED WIRE

(71) Applicant: LANZHOU UNIVERSITY, Gansu (CN)

(72) Inventors: Xingyi Zhang, Lanzhou (CN); Baoqiang Zhang, Anzhou (CN); Qiangqiang Zhang, Lanzhou (CN); Cong Liu, Lanzhou (CN); Huadong Yong, Lanzhou (CN); Youhe Zhou, Lanzhou (CN)

(73) Assignee: LANZHOU UNIVERSITY, Lanzhou (CN)

( * ) Notice: Subject to any disclaimer, the term of this patent is extended or adjusted under 35 U.S.C. 154(b) by 315 days.

(21) Appl. No.: 17/281,957

(22) PCT Filed: Sep. 15, 2020

(86) PCT No.: PCT/CN2020/115297
§ 371 (c)(1),
(2) Date: Mar. 31, 2021

(87) PCT Pub. No.: WO2021/057546
PCT Pub. Date: Apr. 1, 2021

(65) Prior Publication Data
US 2021/0358659 A1 Nov. 18, 2021

(30) Foreign Application Priority Data
Sep. 26, 2019 (CN) .......................... 201910916914.5

(51) Int. Cl.
*B33Y 10/00* (2015.01)
*B33Y 40/20* (2020.01)
(Continued)

(52) U.S. Cl.
CPC ............. *H01B 12/02* (2013.01); *B28B 1/001* (2013.01); *B28B 11/243* (2013.01); *B33Y 10/00* (2014.12);
(Continued)

(58) Field of Classification Search
CPC ....... B29C 64/141; B29C 70/56; B29C 70/22; B29C 70/347; B33Y 10/00; B33Y 80/00
See application file for complete search history.

(56) References Cited

U.S. PATENT DOCUMENTS 4,956,340 A * 9/1990 Kimura .............. H10N 60/0268
505/735
5,110,789 A * 5/1992 Yamaguchi ........ H10N 60/0801
505/433

(Continued)

FOREIGN PATENT DOCUMENTS

| CN | 106994783 | 8/2017 |
| CN | 109020533 | 12/2018 |

(Continued)

*Primary Examiner* — Nahida Sultana
(74) *Attorney, Agent, or Firm* — BOOTH UDALL FULLER, PLC; Kenneth C. Booth

(57) ABSTRACT

The present disclosure relates to a method for preparing high-temperature superconducting yttrium barium copper oxide (YBCO) wire by 3D-printing, this method is divided into the following four steps: firstly, preparing a nano-level superconducting powder precursor; and then, preparing a printing paste with suitable viscosity and supporting characteristics; after that, using a CAD 3D modeling, exporting STL format model data and slicing by a professional software; implementing one-step preparing strands with low AC loss by twisting the print nozzle. Finally, the printed twisted wire is formed into a practical superconducting twisted cable through the processes such as plastic removal process, crystallizing process, oxygen supplementing process and assembling process in order. The present disclosure firstly (Continued)

provides an application for applying high temperature superconducting material to direct ink writing 3D-printing technology. By preparing micro/nano level superconducting core filaments based on 3D-printing, the diameter of the core filaments could be reduced, and thereby a material-structure integrative design could be implemented. The present disclosure simplifies the preparation of high temperature superconducting wires, improves the current-carrying capacity and the production efficiency of the high temperature super conducting wires, and reduces the production cost.

10 Claims, 6 Drawing Sheets

(51) Int. Cl.
| | |
|---|---|
| *B33Y 40/10* | (2020.01) |
| *B28B 1/00* | (2006.01) |
| *B28B 11/24* | (2006.01) |
| *H01B 12/02* | (2006.01) |
| *C01G 3/00* | (2006.01) |

(52) U.S. Cl.
CPC ............... *B33Y 40/10* (2020.01); *B33Y 40/20* (2020.01); *C01G 3/006* (2013.01); *C01P 2006/40* (2013.01)

(56) References Cited

U.S. PATENT DOCUMENTS

| | | | |
|---|---|---|---|
| 2016/0375606 A1 | 12/2016 | Reeves | |
| 2016/0380516 A1* | 12/2016 | Tomsic | ................ H02K 7/1838 |
| | | | 505/163 |
| 2020/0095167 A1* | 3/2020 | Slimani | ............. H10N 60/0268 |
| 2022/0241863 A1* | 8/2022 | Rezaei | .................... B22F 10/64 |
| 2023/0057940 A1* | 2/2023 | Zurcher | ................ C04B 35/587 |

FOREIGN PATENT DOCUMENTS

| | | | | |
|---|---|---|---|---|
| CN | 109435008 | | 3/2019 | |
| CN | 110634615 | | 12/2019 | |
| WO | WO 89/02804 | * | 4/1989 | ................ B22F 3/02 |

* cited by examiner

PREPARATION METHOD OF 3D PRINTING-BASED YBCO SUPERCONDUCTING TWISTED WIRE

CROSS REFERENCE TO RELATED APPLICATIONS

This application is the U.S. National Stage of International Application No. PCT/CN2020/115297, filed Sep. 15, 2020, which claims the benefit and priority to Chinese Application No. 201910916914.5, filed Sep. 26, 2019, the contents of each of which are incorporated herein by reference in their entireties.

FIELD OF THE INVENTION

The invention relates to the technical field of preparation of superconducting twisted wires, and more specifically, relates to a preparation method of yttrium barium copper oxide ($YBa_2Cu_3O_7$) superconducting twisted wire based on 3D-printing.

RELATED ART

Superconducting meta-materials have unique characteristics such as zero resistance, complete anti-magnetic flux and Joseph effect and exist rarely in nature. Superconducting materials have been used in a plenty of valuable applications including in the fields of national defense, energy, transportation, and communications; particularly, the superconducting materials have great potentialities in the fields of superconducting electric power and magnets, for example, the applications concerned on superconducting current limiters, superconducting generators, superconducting filters, superconducting energy storage, etc. Wherein, superconducting wires are significant elements in those applications with superconducting materials.

The predominant proportions of high-temperature superconducting tapes/wires currently used include the first-generation high-temperature superconductors represented by Bi component materials and high-temperature superconductors represented by REBCO ("RE" stands for rare earth elements). In practical applications, due to the limitation of critical current density to the load current capacity about a single high-temperature superconducting tape/wire, it is necessary to connect multiple superconducting tapes/wires in parallel for obtaining a higher load current. However, under the action of alternating current in the parallel connection of the tapes/wires, a superconductor proximity effect and a surface effect might be produced, which lead to an AC loss. Thereby, the safety and stability of the superconducting cable in using state would be affected and it undoubtedly brings about the increase of running risks and operating costs. At present, there have been a series of solutions to the problem in the art, such as changing crystal structures, increasing spaces of between two adjacent superconducting core wires, twisting and transposition of superconducting core wires, and thinning the superconducting core wires so on. In recent years, considerable progress is made in the field of superconducting wire strips. The Karlsruhe Research Center in Germany has designed an RACC cable with periodic trapezoidal distribution along the length direction. The National Institute of Standards and Technology of the United States has proposed a compact CORC conductor cable formed by spirally winding high-temperature superconducting tape around a central skeleton; and MIT has proposed a twisted TSTC cable conductor based on a stack of the superconducting tapes. At the same time, the CICC conductors and Rutherford flat cables with mature techniques are also cable conductors composed of the most basic twisted forms, among the superconducting cables, the twisted cables are the most frequently used with mature techniques. However, core filaments for preparing superconducting cables mainly include Bi component wires which is formed based on the powder-in-tube (PIT) process and filaments which is formed by cutting YBCO tapes. It always needs cumbersome and complicated process to finish twisting and winding steps, and what's more, the core filaments are always prone to be cracked and broken. Thus, the critical current density of the superconducting cable is unstable and the mechanical properties thereof are decreased.

Direct ink writing 3D-printing technology is a novel manufacturing process not depending on pre-set molds. Various ceramic structures and devices with complex configurations can be quickly formed by extruding micro/nano-level filaments followed by a way of being stacked layer by layer, thereby the manufacturing cycle thereof is sharply shortened. Accordingly, such a 3D-printing technology can be used to prepare micro-level filaments or even nano-level filaments and is capable of being used to realize the twisting of the filaments, by which an innovatory conception to improve the critical current and mechanical properties of superconducting wires is provided. However, no relevant researches on providing 3D-printing technology to fabricate high-temperature superconducting wires have been made in the prior art. The present disclosure proposes a quick and precise preparation method of 3D printing-based twisted wires.

SUMMARY OF THE INVENTION

For resolving the technical problems exiting in the prior art, the present disclosure provides a preparation method of 3D printing-based preparation method for YBCO superconducting twisted wire, comprising the following steps:

1) preparing a superconducting powder precursor: taking YBCO superconducting material or mixed powder capable of being sintered as a main printing material for forming a superconducting phase; obtaining printing powders with particle diameters of 100-300 nm by crushing mechanically the main printing material;

2) preparing a printing paste: adding the superconducting powder precursor, which has been ground, to a mixture of polymer binder and lubricant in a proper proportion, for forming a direct ink writing 3D-printing paste;

3) printing a twisted wire by a direct ink writing 3D printer; importing slice data of processed model into a numerical control terminal of a computer, a digital signal is transmitted to a communication board by the computer, the communication board sends simultaneously an ink-supplying communication command and a print-driving command; after sending the ink-supplying communication command, an electromagnetically controlled gas valve is opened, an pneumatic pressure is loaded to a pushing plug in a hopper, then the pressure is transmitted to the printing paste for forming a uniform and smooth printing line from the printing system; after sending the print-driving command, controllable driving in X-Y-Z triaxial directions are implemented by three servo motors, wherein a precise location of the printing needles in an XY plane are provided by slide rail transmission on X and Y axis, and up-down movement of a bottom platform is provided by transmission on a Z axis high-precision roller screw; at the same time, the print-driving command is also sent to the servo motors which bring stable rotation of the assembly needles; thereby three filaments extruded from the needles are fixed on a Z-axis platform and are twisted together in the XY plane under the continuous rotation of the assembly needles; synchronously, in co-operation with an extension of the filaments, the rotation of the needles and the downwards movement of the bottom platform, the twisted wire is prepared by continuously extending the filaments; the twisted wire with the required parameters is prepared by adjustments of diameter of the needle, extrusion pressure, falling speed of the bottom platform, and rotation speed;

4) plastic removing and superconducting crystallizing;
5) assembling process.

Preferably, the mixed powder sintered for forming a superconducting phase includes copper oxide, yttrium oxide and barium carbonate.

Preferably, the polymer binder is polyethylene glycol (PVA), polyvinylpyrrolidone (PVP), polyvinyl butyral (PVB) or sodium carboxymethyl cellulose (CMC), wherein the lubricant is mineral lubricant or vegetable lubricant, and wherein the binder and the lubricant are mixed in a proper proportion.

Preferably, a preparatory work before the step 3) includes: firstly, injecting a proper amount of printing paste into the hopper integrated with the printing needle, through an ink-injecting pressure inlet; secondly, placing a pushing plug into the hopper; finally, connecting a pressure supplying pipe to the ink-injecting pressure inlet by a knuckle joint.

Preferably, the plastic removing and superconducting crystallizing in the step 4) includes: putting the twisted wire, which has been printed, in a high-temperature furnace for performing a thermal treatment so as to remove polymers and impurities in the strands, wherein the conditions of the plastic removal include a constant temperature of 500° C. for 12-24 hours with a heating rate of 0.5-1° C./min; wherein conditions of the superconducting crystallizing process include a sintering temperature of 900-960° C. for 20-30 hours in an oxygen atmosphere, and the rate of up-down temperature is 1° C./min; and wherein the sintered sample is supplemental oxygenation for 30 hours at an oxygen partial pressure of 0.5-2 MPa at 500° C.

Preferably, the assembling process in the step 5): welding a copper sleeve by mature technologies related to laser welding or electron beam sealing welding for meeting the requirements for mechanical strength, the requirements for current-carrying, the requirements for safety; thereby complex composite wires with different cross-sectional sizes and shapes are obtained.

The printing process according to present disclosure is mainly driven by a triple-axis linkage and rotation of assembling needles. The ink-supplying communication command is mainly controlled according to a pneumatic pressure, wherein different pressures correspond to specific ink-supplying speeds or printing line speeds, and, the rotating rate of the assembling needles and the falling speed of a bottom platform are capable of being adjusted and matched by measuring the ink-supplying speed, thus, the twisted wires with different diameters, different intercepts, different lengths and different core filaments can be obtained by continuous feedbacks and adjustments.

The rotatable assembly of the needles is the pivotal and significant for printing of the twisted wires, the pressure in the air pipe is used to provide motive power to extrude the paste from the printing needles, and the driving shaft is driven by the servo motor. After the printing process is started, the paste is capable of passing through a supplying pipe and being extruded out uniformly from the needle, then the filaments extruded are fixed onto the bottom platform. Then, the assembling needles is rotated by the turning of a driving shaft, in co-operation with the continuous extrusion of the paste and the downwards of the bottom platform, twisted wires with the required parameters are prepared by performing the adjustments of the diameter of the needle, the extrusion pressure, the falling speed of the bottom platform and rotation speed of the assembling needles as well.

The present disclosure further provides a 3D printing-based preparation method of YBCO superconducting bulk, wherein, comprising following steps:

1) preparing a superconducting powder precursor:
taking YBCO superconducting material or mixed powder being sintered for forming a superconducting phase as a main printing material;
obtaining printing powders with particle diameters of 100-300 nm by crushing mechanically the main printing material;
2) preparing a printing paste;
adding the superconducting powder precursor, which has been ground, to a mixture of polymer binder and lubricant in a proper proportion for forming a direct ink writing 3D-printing paste;
3) printing a bulk:
venting air in the printing paste by vacuum-assist method;
injecting the printing paste into a printing syringe and extruding the printing paste out of a printing needle by a pneumatic pressure or by way of mechanical propelling;
designing a printing configuration/path by using a computer modeling method;
duplicating the designed printing configuration on a carrier platform by a way of layered depositions through the direct ink writing 3D-printing technology and forming a moist sample;
4) freeze drying and obtaining a green body:
placing the printed moist sample in a freeze dryer with a temperature of −30--60° C.;
removing ice crystals produced in the moist sample and obtaining the green body;
5) plastic removing and superconducting crystallizing.

What's more, the mixed powder sintered for forming a superconducting phase includes copper oxide, yttrium oxide and barium carbonate.

Further, the polymer binder is polyethylene glycol (PVA), polyvinylpyrrolidone (PVP) polyvinyl butyral (PVB) or sodium carboxymethyl cellulose (CMC), wherein the lubricant is mineral lubricant or vegetable lubricant, and wherein the binder and the lubricant are mixed in a proportion.

Furthermore, the plastic removing and superconducting crystallizing in the step 5) includes: putting the green body, which has been printed, in a high-temperature furnace for performing a thermal treatment so as to remove polymers and impurities, wherein conditions of the plastic removal include a constant temperature of 500° C. for 12-24 hours with a heating rate of 0.5-1° C./min; wherein conditions of the superconducting crystallizing process include a sintering temperature of 900-960° C. for 20-30 hours in an oxygen atmosphere, and rate of up-down temperature is 1° C./min; and wherein the sintered sample is oxygenated for 30 hours at an oxygen partial pressure of 0.5-2 MPa at 500° C.

For the first time, the direct ink writing 3D-printing technology is applied to the high temperature superconducting material. By preparing micro/nano level superconducting core filaments based on the 3D-printing, the diameter of the core filaments can be reduced; meanwhile, though use of modeling, slicing by the computer and twisting by the printing needles, the procedure provides a way out of the problem that the preparation of the high temperature superconducting wires is always limited by the mold, and thereby a material-structure integrative design can be implemented. The present disclosure simplifies the preparation of high temperature superconducting wires, reduces the difficulties in the crystallizing process and the twisting process, improves the current-carrying capacity and the production efficiency of the high temperature superconducting wires, and what's more reduces the manufacturing cost. The present disclosure is greatly suitable for a large-scale applied generalization of the superconducting wires and therefore the invention brings huge scientific value and marketable value.

BRIEF DESCRIPTION OF THE DRAWINGS

The invention will now be more particularly described, by way of example only, with reference to the accompanying drawings, in which.

Figure 1:
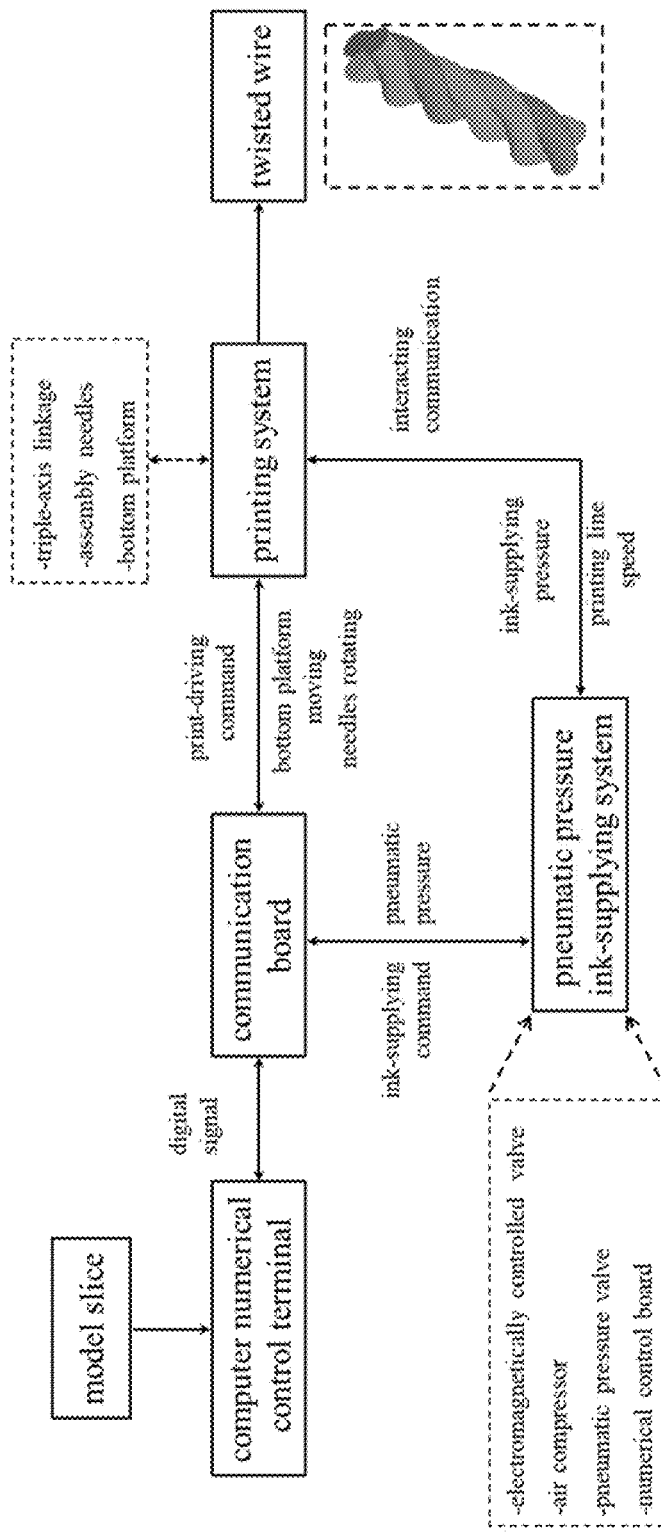
FIG. 1 is a schematic and flow-process diagram of the twisted wire printing system.
Figure 2:
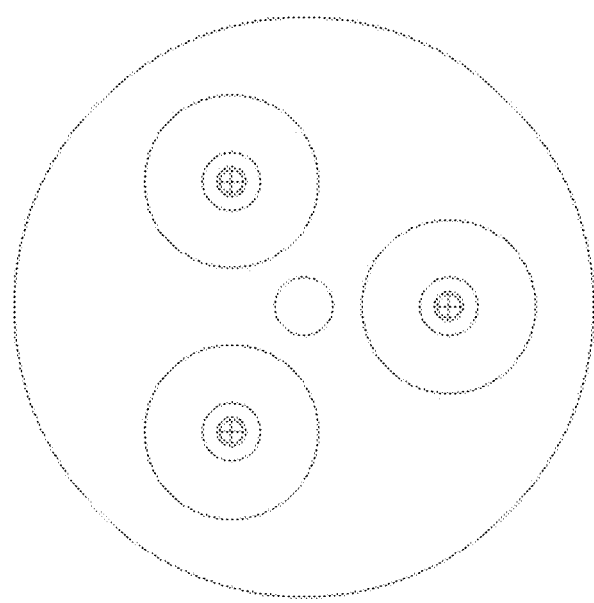
FIG. 2 is a tope view of the assembly of the needles.
Figure 3:
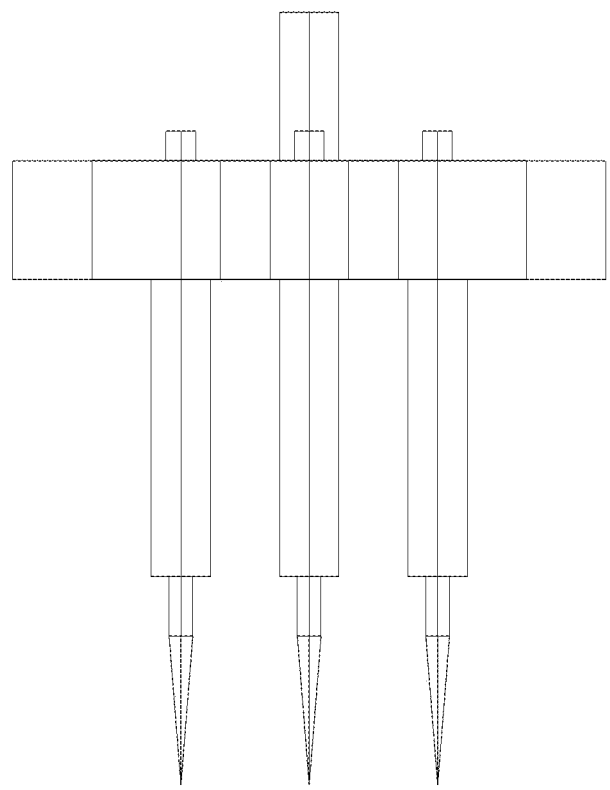
FIG. 3 is a left view of the assembly of the needles.
Figure 4:
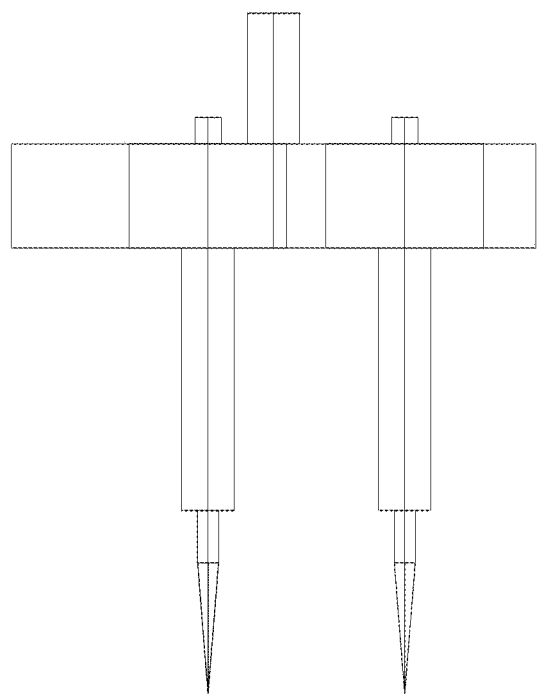
FIG. 4 is a front view of the assembly of the needles.
Figure 5:
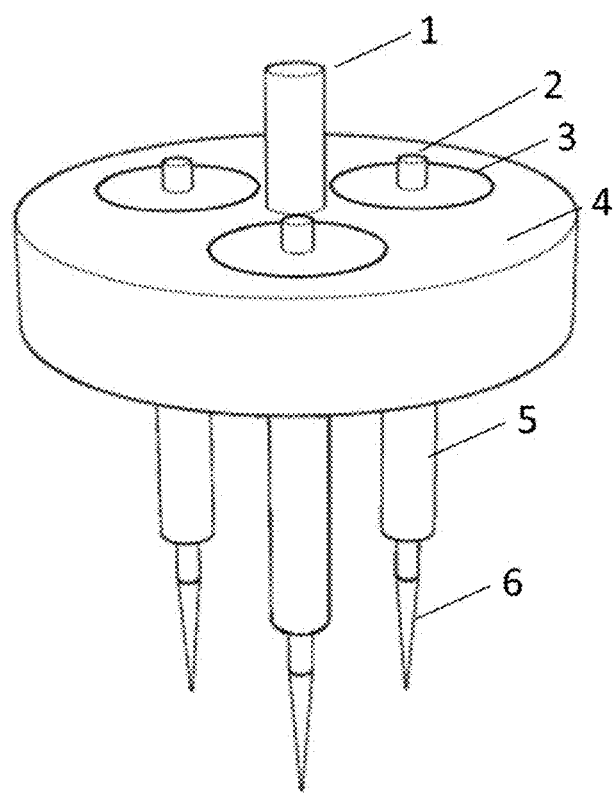
FIG. 5 is a perspective view of the assembly of the needles.
Figure 6:
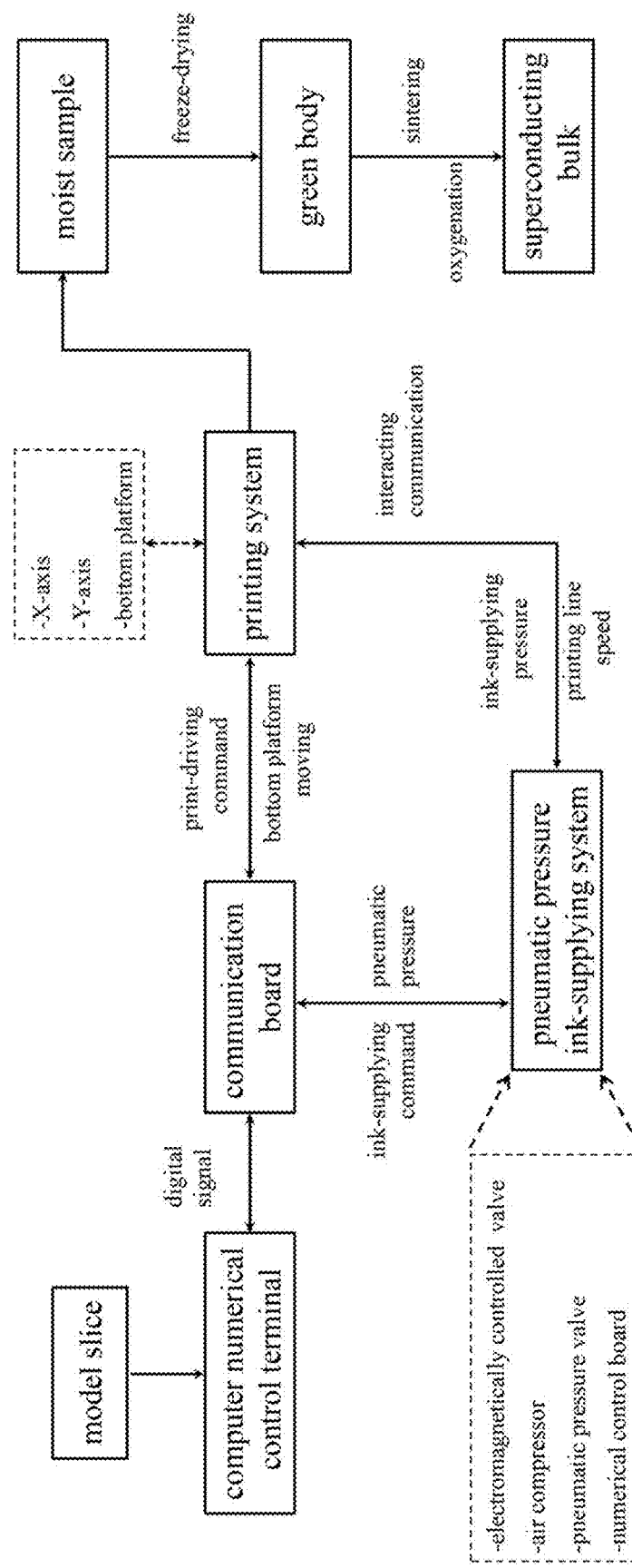
FIG. 6 is a another schematic and flow-process diagram of the bulk printing system.
Figure 7:
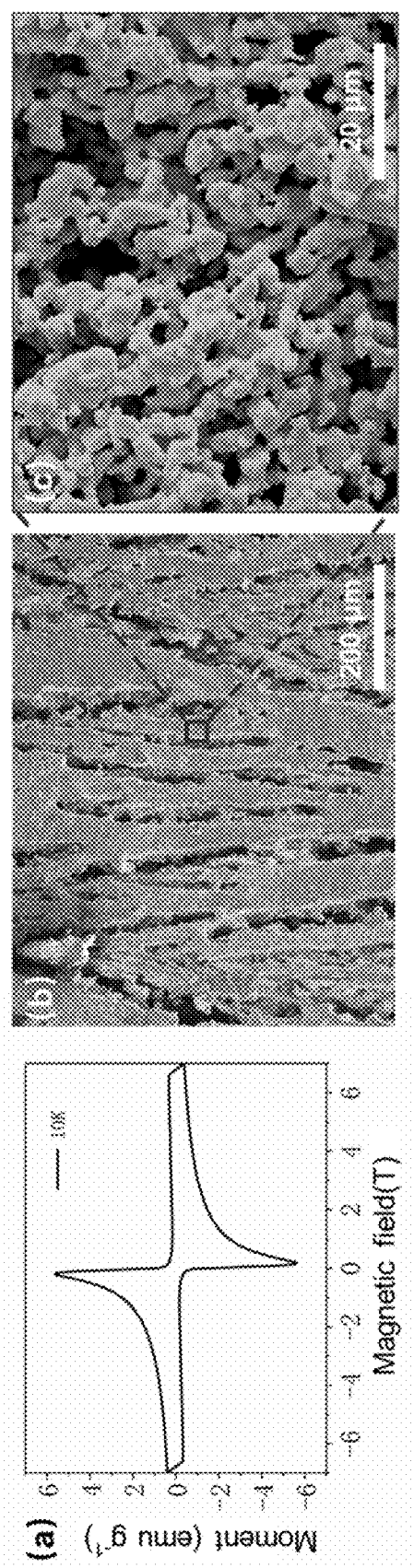
FIG. 7 is a view of electromagnetic performance and constructional characteristics for the 3D printing YBCO superconducting bulk.
Figure 8:
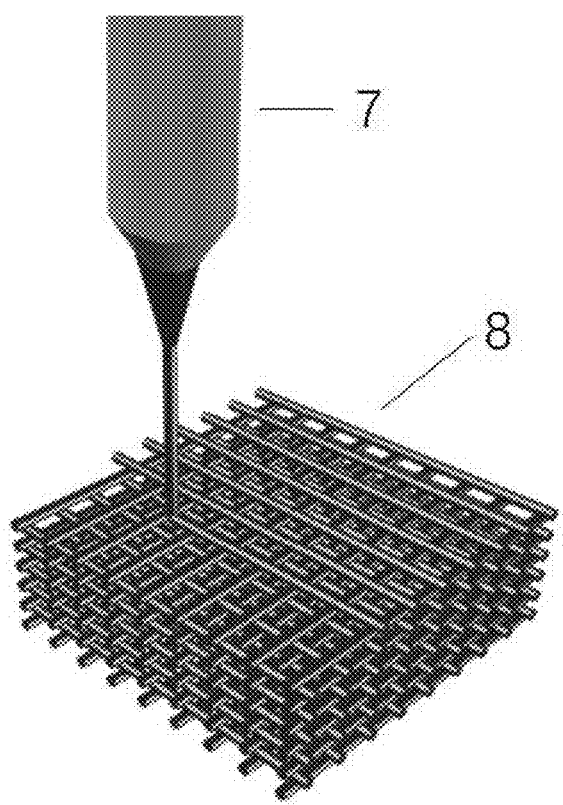
FIG. 8 is a view of the YBCO superconducting sample of moist bulk being printed by way of the 3D printing-based preparation method.

IN THE DRAWINGS 1. driving shaft
2. ink-injecting pressure inlet
3. hopper
4. driving plate
5. supplying pipe
6. printing needle
7. printing syringe
8. bulk

DETAILED DESCRIPTION OF THE INVENTION

The present invention discloses a 3D printing-based preparation method of YBCO superconducting twisted wire.

Please see the following example.

First of all, the invention discloses the preparation of superconducting powder precursor. The main printing materials are selected from YBCO superconducting materials or mixed powders (for example, the mixed powders with copper oxide, yttrium oxide and barium carbonate) capable of being sintered for obtaining a superconducting phase. Being crushed mechanically, the main printing materials become printing powders with particle diameters of 100-300 nm. Here the mechanical trituration refers to different types, such as ball milling etc.

Secondly, the invention discloses the preparation of printing paste. To be specific, the well milled superconducting powder precursor is added into a mixture of polymer binder and lubricant with a proper proportion to form the direct ink writing 3D-printing paste. Here, the polymer binder is selected from one of polyethylene glycol (PVA), polyvinylpyrrolidone (PVP), polyvinyl butyral (PVB), sodium carboxymethyl cellulose (CMC) and so on, meanwhile, the lubricant can be mineral lubricant or vegetable lubricant. The binder and the lubricant are mixed together in a proper proportion.

Then the step of printing of twisted wire is disclosed, that is, printing the twisted wire by modifying a direct ink writing 3D printer and the printing process in details is shown in FIG. 1.

Before the printing process, preparatory work needs to be made as follows. Firstly, through an ink-injecting pressure inlet, a proper amount of printing paste is injected into a hopper integrated with the printing needle. Secondly, a pushing plug is placed into the hopper. Finally, a pressure supplying pipe is connected to the ink-injecting pressure inlet by a knuckle joint. For example, the configuration of the assembly needles is shown in FIGS. 2-5.

Printing process: slice data of processed model is imported into a computer numerical control terminal of a computer, by which a digital signal is transmitted to the communication board, and the communication board is capable of sending the ink-supplying communication command and the print-driving command simultaneously. After the ink-supplying communication command has been sent, an electromagnetically controlled valve, such as an electromagnetically controlled gas valve is opened, thus a pneumatic pressure is loaded to the pushing plug in the hopper, and then the pressure is transmitted to the printing paste for forming a pressurized paste. By this way, the pressurized paste is capable of being evenly extruded from the printing needle. After the print-driving command is sent, three servo motors are used to conduct controllable drivings respectively in X, Y and Z-axis directions, what's more a precise positioning of the printing needle in the X-Y plane are provided by the transmission on X and Y-axis of slide rails, and in addition, the upwards movement and downwards movement of a bottom platform is implemented by transmission of on a Z-axis high-precision roller screw. At the same time, the print-driving command is also sent to the servo motors capable of bringing stable rotation of the needles. Three filaments extruded from the needle are fixed on the Z-axis platform and then twisted together in the X-Y plane under the action of continuous rotation of the assembly needles. At the same time, in co-operation with extension of the filaments, the rotation of the assembly needles and the synchronous downwards movement of the bottom platform, the preparation of the twisted wires is implemented by continuously extending the filaments. The twisted wires with the required parameters are capable of being prepared by performing adjustments to the diameter of the needle, the extrusion pressure, the falling speed of the assembling needles, and the rotation speed as well.

4. Plastic Removal Process and Superconducting Crystallizing Process

The twisted wires which have been printed, are placed in a high-temperature furnace for performing a heat treatment so as to remove the polymers and impurities. The plastic removal needs to be finished under conditions of a constant temperature of 500° C. for 12-24 hours with a heating rate of 0.5-1° C./min. The conditions of the crystallizing process comprise a sintering temperature of 900-960° C. for 20-30 hours in an oxygen atmosphere, and the rate of rising or falling of temperature is 1° C./min. Finally, supplemental oxygenation is provided to the sintered sample for 30 hours at an oxygen partial pressure of 0.5-2 MPa at 500° C.

5. Assembling Process

For satisfying requirements such as on mechanical strength, current-carrying, safety and so on during using of the superconducting wires, a copper sleeve is welded by mature technologies related to laser welding or electron beam sealing welding. Thereby, the complex composite wires with various cross-sectional sizes and various shapes are obtained.

The invention further discloses a 3D printing-based preparation method of YBCO superconducting bulk. In addition to the step 1) of preparing a superconducting powder precursor and step 2) of preparing a printing paste which are the same with those in the preparation method of YBCO superconducting twisted wire, a step for printing a bulk is further provided. In this step (defined as step 3)), the air in the printing paste should be vented. A vacuum-assist method is preferably used for better air exclusion. Then the prepared printing paste is injected into the printing syringe and extruded out of a printing needle by a pneumatic pressure or by way of mechanical propelling. In this, method, it needs to design a printing path for the required configuration or structure by using a modeling program and then, the designed printing configuration can be duplicated on a carrier platform by way of layered depositions through the direct ink writing 3D-printing technology and a moist sample can be formed. In the preparation method a single printing needle is preferably adopted.

Next, the freeze-drying step is to be carried (defined as step 4)). Concretely, the printed moist sample is placed in a freeze dryer with a lower temperature for example −30-60° C. for around 24-48 hours. The ice crystals produced in the moist sample should be removed and the green body is finally obtained.

The step of plastic removal process and superconducting crystallizing process is identical with the step 4) of the preparation method of YBCO superconducting twisted wire. The detailed information will not be repeatedly disclosed accordingly.

The method of the direct ink writing 3D-printing technology combines with freeze-drying technique, by which YBCO superconducting bulks with several expectant performances, such as ultra-light, porous, complex-shaped highly crystalline, and good electromagnetic properties, etc. Bulks with different structures can be printed, for example, cuboids, cubes, grids, flywheels or carved discs, etc.

For the first time in the art, the present disclosure provides advanced technology related to a direct ink writing 3D-printing for preparing for micro/nano-level superconducting core filaments, wherein the superconducting strands are printed out by the steps of modeling, slicing and twisting and so on, and finally the preparation of superconducting twisted wires can be implemented by plastic removal process, superconducting crystallizing process and assembling process.

The present disclosure further discloses a method for preparing high-temperature superconducting yttrium barium copper oxide (defined as YBCO in the disclosure) wire by 3D-printing by the following four steps. Firstly, preparing a nano-level superconducting powder precursor; then, preparing a printing paste with suitable viscosity and supporting characteristics; next, using a 3D modeling via CAD, exporting STL format model data and slicing by a professional software; to reduce the AC loss, implementing one-step preparation for strands through twisting the print nozzle.

Finally, the printed twisted wire is formed into a practical superconducting twisted cable via plastic removal process, crystallizing process, supplemental oxygenation process and assembling process as well.

It should be noted that the above disclosures are only preferred embodiments of the present invention and are not intended to limit the present invention. For those skilled in the art, although the present invention has been described in detail with reference to the foregoing embodiments, the technology described in the foregoing embodiments may be modified, or some of the technical features thereof may be equivalently replaced. Any modification, equivalent replacement, improvement, etc., without departing from the spirit of the present disclosure, should be included in the protection scope of the present disclosure.

What is claimed is:

1. A 3D printing-based preparation method of YBCO superconducting twisted wire, wherein, comprising following steps:

1) Preparing a superconducting powder precursor:
    taking YBCO superconducting material or mixed powder being sintered for forming a superconducting phase as a main printing material;
    obtaining printing powders with particle diameters of 100-300 nm by crushing mechanically the main printing material;
2) Preparing a printing paste:
    adding the superconducting powder precursor, which has been ground, to a mixture of polymer binder and lubricant to form a direct ink writing 3D-printing paste;
3) Printing a twisted wire by a direct ink writing 3D printer;
    importing slice data of a processed model into a numerical control terminal of a computer, a digital signal being transmitted to a communication board by a computer, simultaneously the communication board sending an ink-supplying communication command and a print-driving command;
    after sending the ink-supplying communication command, an electromagnetically controlled gas valve is opened, a pneumatic pressure is loaded to a pushing plug in a hopper, then the pressure is transmitted to the printing paste for forming a uniform and smooth printing line;
    after sending the print-driving command, controllable drivings in X-Y-Z triaxial directions are separately implemented by three servo motors, wherein a precise location of printing needles in an X-Y plane are provided by moving on X and Y axes, and an up-down movement of a bottom platform is provided by transmission via a roller screw on a Z axis;
    at the same time, the print-driving command is also sent to the servo motors which bring a rotation of the printing needles; thereby three filaments extruded from the printing needles are fixed on a Z-axis platform and are twisted together in the X-Y plane under continuous rotations of assembly of the printing needles;
    synchronously, in co-operation with an extension of the filaments, the rotation of the printing needles and the downwards movement of the bottom platform, the twisted wire is prepared by continuously extending the filaments through the printing needles in the Z-axis direction and moving synchronously the platform down; the twisted wire with the required parameters is prepared by adjustments of diameter of the printing needles, extrusion pressure, falling speed of the bottom platform and rotation speed;

4) Plastic removing and superconducting crystallizing;
5) Assembling process.

2. The 3D printing-based preparation method of YBCO superconducting twisted wire according to claim 1, wherein, the mixed powder sintered for forming a superconducting phase includes copper oxide, yttrium oxide and barium carbonate.

3. The 3D printing-based preparation method of YBCO superconducting twisted wire according to claim 1, wherein, the polymer binder is polyethylene glycol (PVA), polyvinylpyrrolidone (PVP) polyvinyl butyral (PVB) or sodium carboxymethyl cellulose (CMC), wherein the lubricant is mineral lubricant or vegetable lubricant.

4. The 3D printing-based preparation method of YBCO superconducting twisted wire according to claim 1, wherein, a preparatory work before the step 3) includes:
    firstly, injecting printing paste into the hopper integrated with the printing needle, through an ink-injecting pressure inlet;
    secondly, placing a pushing plug into the hopper;
    finally, connecting a pressure supplying pipe to the ink-injecting pressure inlet by a knuckle joint.

5. The 3D printing-based preparation method of YBCO superconducting twisted wire according to claim 1, wherein, the plastic removing and superconducting crystallizing in the step 4) includes:
    putting the strands, which have been printed, in a high-temperature furnace for performing a thermal treatment so as to remove polymers and impurities, wherein conditions of the plastic removal include a constant temperature of 500° C. for 12-24 hours with a heating rate of 0.5-1° C./min; wherein conditions of the superconducting crystallizing process include a sintering temperature of 900-960° C. for 20-30 hours in an oxygen atmosphere, and rate of up-down temperature is 1° C./min; and wherein the sintered sample is oxygenated for 30 hours at an oxygen partial pressure of 0.5-2 MPa at 500° C.

6. The 3D printing-based preparation method of YBCO superconducting twisted wire according to claim 1, wherein, the assembling process in the step 5):
    welding a copper sleeve by mature technologies related to laser welding or electron beam sealing welding for meeting the requirements for mechanical strength, the requirements for current-carrying, the requirements for safety; thereby complex composite wires with different cross-sectional sizes and shapes are obtained.

7. A 3D printing-based preparation method of YBCO superconducting bulk, wherein, comprising following steps:
    1) Preparing a superconducting powder precursor:
    taking YBCO superconducting material or mixed powder being sintered for forming a superconducting phase as a main printing material;
    obtaining printing powders with particle diameters of 100-300 nm by crushing mechanically the main printing material;
    2) Preparing a printing paste:
    adding the superconducting powder precursor, which has been ground, to a mixture of polymer binder and lubricant to form a direct ink writing 3D-printing paste;
    3) Printing a bulk:
    venting air in the printing paste by vacuum-assist method;
    injecting the printing paste into a printing syringe and extruding the printing paste out of a printing needle by a pneumatic pressure or by way of mechanical propelling;
    designing a printing configuration/path by using a computer modeling method;
    duplicating the designed printing configuration on a carrier platform by a way of layered depositions through the direct ink writing 3D-printing technology and forming a moist sample;
    4) Freeze drying and obtaining a green body:
    placing the printed moist sample in a freeze dryer with a temperature of −30-60° C.;
    removing ice crystals produced in the moist sample and obtaining the green body;
    5) Plastic removing and superconducting crystallizing.

8. The 3D printing-based preparation method of YBCO superconducting bulk according to claim 7, wherein, the mixed powder sintered for forming a superconducting phase includes copper oxide, yttrium oxide and barium carbonate.

9. The 3D printing-based preparation method of YBCO superconducting bulk according to claim 7, wherein, the polymer binder is polyethylene glycol (PVA), polyvinylpyrrolidone (PVP) polyvinyl butyral (PVB) or sodium carboxymethyl cellulose (CMC), wherein the lubricant is mineral lubricant or vegetable lubricant.

10. The 3D printing-based preparation method of YBCO superconducting bulk according to claim 7, wherein, the plastic removing and superconducting crystallizing in the step 5) includes:
    putting the green body, which has been printed, in a high-temperature furnace for performing a thermal treatment so as to remove polymers and impurities, wherein conditions of the plastic removal include a constant temperature of 500° C. for 12-24 hours with a heating rate of 0.5-1° C./min; wherein conditions of the superconducting crystallizing process include a sintering temperature of 900-960° C. for 20-30 hours in an oxygen atmosphere, and rate of up-down temperature is 1° C./min; and wherein the sintered sample is oxygenated for 30 hours at an oxygen partial pressure of 0.5-2 MPa at 500° C.

* * * * *